United States Patent [19]

Schweitzer et al.

[11] E Re. 31,167

[45] Reissued Mar. 8, 1983

[54] WIND-PROPELLED APPARATUS

[75] Inventors: Henry H. Schweitzer, Pacific Palisades; James R. Drake, Santa Monica, both of Calif.

[73] Assignee: Windsurfing International, Inc., Torrance, Calif.

[21] Appl. No.: 910,564

[22] Filed: May 30, 1978

Related U.S. Patent Documents

Reissue of:

[64] Patent No.: 3,487,800
Issued: Jan. 6, 1970
Appl. No.: 716,547
Filed: Mar. 27, 1968

[51] Int. Cl.[3] ..... B63B 15/02; B63C 7/00; B63H 9/04; B63H 9/10

[52] U.S. Cl. ..... 114/39; 114/91; 114/97; 114/102

[58] Field of Search ..... 114/39, 90, 91, 97, 114/98, 102

[56] References Cited

U.S. PATENT DOCUMENTS

| | | | |
|---|---|---|---|
| 2,353,007 | 7/1944 | Blackman | 114/91 |
| 3,057,316 | 10/1962 | Hansen | 114/39 |
| 3,141,435 | 7/1964 | Moffitt, Jr. | 114/90 X |
| 3,173,395 | 3/1965 | Laurent | 114/102 X |
| 3,349,741 | 10/1967 | Herbst | 114/39 |

FOREIGN PATENT DOCUMENTS

| | | |
|---|---|---|
| 262081 | 5/1965 | Australia . |
| 301580 | 5/1916 | Fed. Rep. of Germany . |
| 1264282 | 3/1965 | Fed. Rep. of Germany . |
| 1955324 | 8/1966 | Fed. Rep. of Germany . |
| 958521 | 3/1950 | France . |
| 1022300 | 3/1953 | France . |
| 773008 | 4/1957 | United Kingdom . |
| 1010090 | 11/1965 | United Kingdom . |
| 1052549 | 12/1966 | United Kingdom . |
| 1087239 | 10/1967 | United Kingdom . |

OTHER PUBLICATIONS

Haffenreffer, C. W., published by Herreschoff Manufacturing Co., of Bristol, R.I., received in N.Y. Public Library, 1940.

"The Wishbone Rig", published Feb. 1957, reprint Nov. 1963, Amateur Yacht Research Society (A.Y.R.S.).

"Wishbone Rig" by Lt. General Sir Frederick A. M. Browning, published in Yachting World of Jan. 1956, pp. 26–27.

*Yachting World*, Jan. 1956, p. 27.

Crosby, W. F., article "The Wishbone Rig on Small Boats", Aug. 1935 issue of *The Rudder* magazine, vol. 51, pp. 37–39.

The Dinghy Year Book, 1961, *The Unstayed Mast*, pp. 22–27, Coles Limited.

Darby, S. Newman, "Sailboating: Exciting New Water Sport", *Popular Science*, Aug. 1965, pp. 138–141.

*Primary Examiner*—Douglas C. Butler
*Attorney, Agent, or Firm*—Nilsson, Robbins, Dalgarn, Berliner, Carson and Wurst

[57] ABSTRACT

Wind-propelled apparatus in which a mast is universally mounted on a craft and supports a boom and sail. Specifically a pair of curved booms are arcuately connected athwart the mast and secure the sail therebetween, the position of the mast and sail being controllable by the user but being substantially free from pivotal restraint in the absence of such control.

7 Claims, 4 Drawing Figures

WIND-PROPELLED APPARATUS

Matter enclosed in heavy brackets [ ] appears in the original patent but forms no part of this reissue specification; matter printed in italics indicates the additions made by reissue.

BACKGROUND OF THE INVENTION

Field of the invention

The field of art to which the invention pertains includes the field of ships, particularly sailboats and iceboats, and the field of land vehicle sail attachments.

Description of the prior art

Sail propulsion has been suggested as a motive means not only for boats and iceboats, but also for such watercraft as surfboards and landcraft such as skateboards and sleds, i.e., generally any lightweight small craft. Typically, a sail is provided on a mast that is rigidly secured to the craft in a vertical position or else the sail and mast are entwined in a network of riggings and control mechanisms.

The general effect of providing a sail on a normally sailfree vehicle is to convert the vehicle into a water or landboat. Thus, by rigidly securing a sail to a surfboard, the feel of the surfboard and enjoyment as such is lost and the skill normally required to control it is no longer needed. Instead, one obtains the speed and feel of a light sailboat and needs substantially only those skills appropriate to control a sailboat. The same "denaturing" occurs with other vehicles modified to bear a sail.

A further problem arises when a sail is fitted to a vehicle that does not have high roll stability in that sudden or excessive winds can overturn the vehicle.

A need therefore exists for safely providing wind-propulsion means for a vehicle not normally so equipped but which means preserves the original ride and control characteristics of the vehicle.

SUMMARY OF THE INVENTION

The present invention provides wind propulsion means for a vehicle that adds new dimensions of wind responsiveness and speed and yet enhances the vehicle's normal ride and control characteristics to greatly increase the enjoyment obtained therefrom. Wind-propelled apparatus is provided comprising vehicle body means adapted to support a user and wind-propulsion means pivotally associated with the body means and adapted to receive wind for motive power. The position of the propulsion means is controllable by the user and is substantially free from pivotal restraint in the absence of such control.

In particular embodiments, the propulsion means is connected to the vehicle body by means of a universal joint, e.g. a joint having three axes of rotation, or other such joint to enable the propulsion means to be substantially free-floating in the absence of user control.

The wind propulsion means can comprise a spar pivotally attached to the vehicle body and a sail on the spar. Means are provided to allow the user to grasp the sail on one or both sides thereof. Thus, a boom is provided laterally disposed on the spar to hold the sail taut and provide a hand-hold. In particular embodiments, a pair of booms is provided arcuately connected athwart the spar and securing the sail therebetween.

The invention can be used on watercraft, iceboats and landcraft. It can be used on small yachts, runabouts, canoes, rowboats, and other such craft, but is most advantageously used on small and lightweight vehicles such as surfboards, iceboats, skateboards, and sleds. Leeboard means can be provided for a watercraft of low roll stability such as a surfboard. The term "leeboard" is meant to include center boards and daggerboards, as these terms are known to the sailing art, as well as other projections from the body of the craft, planar or otherwise extending into or onto the water for stabilization.

The present invention allows essentially all of the steering and control to be accomplished through the sail; i.e. no rudder or other steering mechanism is needed, although such need not be excluded. One may accelerate, turn and tack merely by manipulating the sail. However, because the sail is pivotally unrestrained, it must be held by the user with the user relying on his skill with the vehicle for balance. In the event of sudden or excessive winds, the user need only release the sail and it will immediately fall in any direction, freeing the vehicle from the propulsive force.

DESCRIPTION OF THE PREFERRED EMBODIMENT

Figure 1:
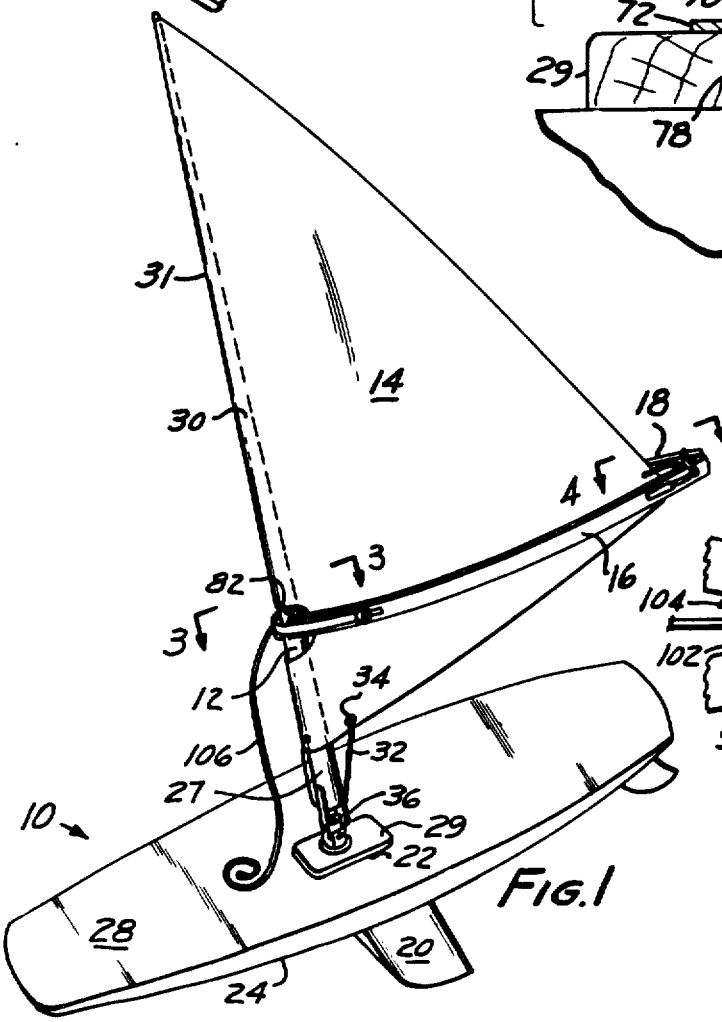
FIG. 1 is a perspective view of a wind-propelled apparatus according to an embodiment of this invention obtained by modifying a surfboard with a sail, spar and boom therefor and leeboard.

Referring to FIG. 1, a wind-propelled apparatus is shown, including a surfboard 10, spar 12, triangular sail 14 and booms 16 and 18. The surfboard 10 has a daggerboard 20, as leeboard, inserted through an opening 22 provided in the body of the surfboard 10 and projecting obliquely from the bottom 24 thereof. A top portion of the daggerboard 20 extends somewhat beyond the top surface 28 of the surfboard 10 to provide a platform 29 for pivotal attachment of the spar 12 as will be fully described below.

The spar 12 is a stout, rounded, elongated fiberglass shaft which, in this case, is hollow for lightneses but may be of solid wood or metal, and has a cylindrical wood base 27 wedged through its lower end. The spar 12 serves as a pivotal mast for the sail 14 and is inserted within a hem 30 tapering along a long edge 31 of the sail 14 toward the top thereof. The bottom of the sail 14 is secured to the spar 12 by a rope 32 threaded through an eyelet 34 in a lower edge of the sail 14 adjacent to the spar 12.

Figure 2:
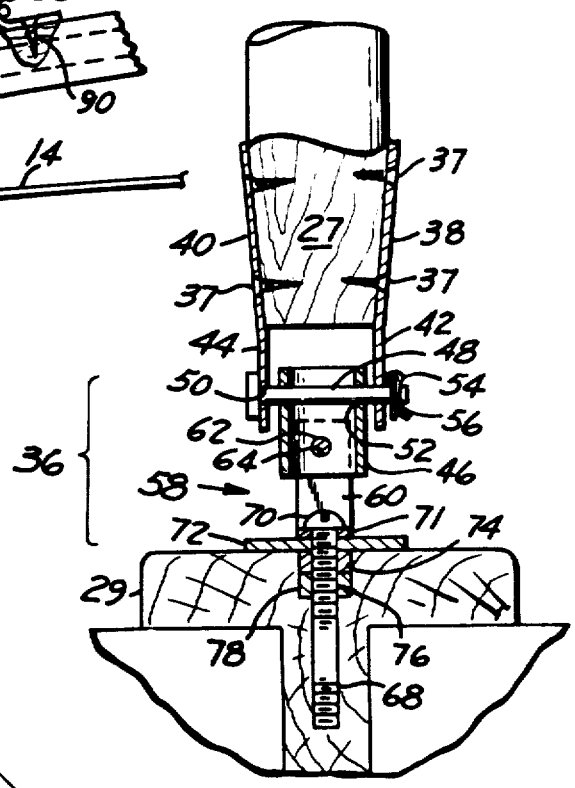
FIG. 2 is a sectional view, on line 2—2 of FIG. 1, of a universal joint used for pivotal motion of the sail.

Referring to FIG. 2, the spar 12 is connected to the daggerboard platform 29 by means of a three-axis universal joint 36. The joint 36 is made completely of stainless steel and is attached to the spar 12 by means of brace plates 38 and 40 held on opposite sides of the spar base 27 by wood screws 37. The brace plates 38 and 40 have extended portions 42 and 44, respectively, somewhat below the spar base 27 and disposed on opposite sides of a short section of stainless steel tubing 46. A one-quarter inch diameter headed pin 48 extends through holes 50 and 52 in the brace plate extensions 42 and 44 and is rotatably secured by a cotter pin 54 inserted through a cotterway 56 in the headed pin 48.

A U-shaped clevis 58 of stainless steel sheeting is disposed on the tubing 46 so that its sides 60 (only one of which is shown) lie below and transverse to the brace plate extensions 42 and 44. A ¼-inch diameter headed pin 62 (shown in cross-section in FIG. 2) extends through holes 64 in the clevis sides and in the tubing 46 and is rotatably secured by a cotter pin (not shown) through a cotterway in the headed pin 62.

A three-inch long, ¼-inch diameter round head machine screw 68 rotatably secures the clevis to the daggerboard 20 by extending through a hole 70 in the base 71 of the clevis 58 and from there through a washer 72 and underlying nut 74 and locknut 76 set in a mortise 78 in the daggerboard platform 29. The machine screw 68 holds the base of the clevis 58 with sufficient play to allow sliding rotation of the clevis 58 against the washer 72.

Figure 3:
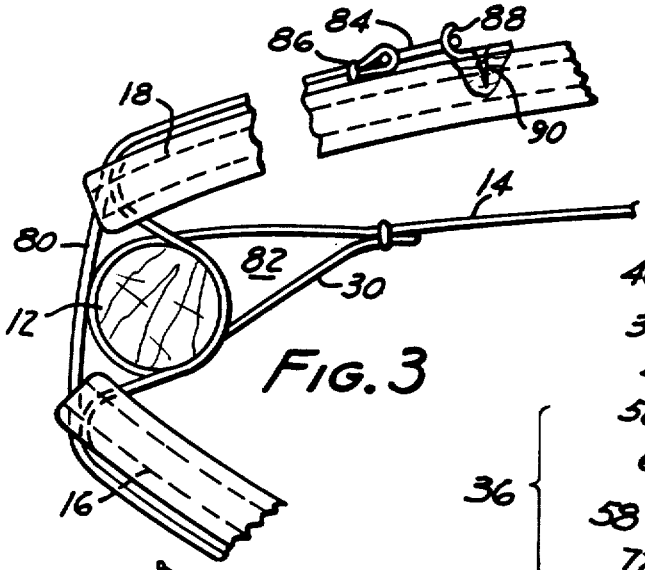
FIG. 3 is a sectional view, on line 3—3 of FIG. 1, of the spar-side juncture between the booms.

Referring to FIGS. 1 and 3, a pair of curved, laminated wood booms 16 and 18 are provided about four feet from the surface 28 of the surfboard 10 and are arcuately connected at both their ends. At the spar-end, the booms are connected together and to the spar 12 by a loop of one-inch wide webbed tape 80 encircling the spar 12 through a crescent-shaped opening 82 in the sail hem 30. The tape loop 80 has brass rings 84 at its ends held in place by stitches 86 through the looped tape and which secure the tape 80 to the booms 16 and 18 by engagement with brass hook fittings 88 secured to the booms 16 and 18 by wood screws 90. The booms 16 and 18 thus provide a handhold for the sail 14 spaced upwardly from at least an intermediate point on the lower edge of the sail.

Figure 4:
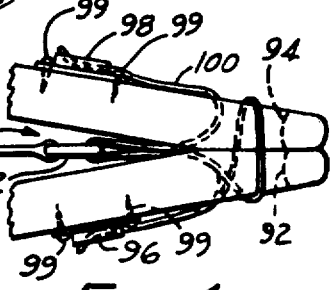
FIG. 4 is a sectional view, on line 4—4 of FIG. 1, of the clew-side juncture between the booms.

Referring to FIGS. 1 and 4, the booms 16 and 18 are provided at their clew ends with outhaul openings 92 and 94, respectively, and jamb cleats 96 and 98, respectively, which are secured to the booms 16 and 18 by screws 99. An outhaul 100 is threaded from the jamb cleat 98 of one boom 18 through the outhaul opening 94 in that boom 18, through a reinforced opening 102 in the sail clew 104, through the outhaul opening 92 in the second boom 16, looped through both outhaul openings 94 and 92 and from there to a second jamb cleat 96 on the other boom 16. The outhaul 100 is then pulled taut and secured by the second jamb cleat 96 to hold the sail 14 taut between the booms 16 and 18.

*By reference to the drawings and the foregoing, it is evident that from the aft corner (clew) of the sail, the foot of the sail extends obliquely downwardly with respect to the booms toward the lower fore corner of the sail, which is along the spar.*

In operation, the user stands on the top 28 of the surfboard 10 behind the point where the spar 12 is attached by the universal joint 36 and grips one or the other of the booms 16 or 18. If he were going before the wind and wished to make a turn, he would tilt the sail 14 forward, thus applying the force of the wind to the nose of the surfboard 10 and causing the board 10 to turn to the left or right depending on which side of the sail 14 was windward. On the other hand, if he wanted to come about into the wind for the purpose of tacking, he would pull the sail 14 backwardly to apply the force of the wind to the rear of the board 10, causing the rear of the board 10 to move so as to come into the wind. As he is into the wind, he may complete the tack by merely walking in front of the sail 14, grasping the boom on the other side and setting the sail 14 so that the wind captures it and the board 10 is then on its new course. The sail may be maneuvered forward and backward for speed control.

In the event that a sudden surge of wind threatens to capsize the surfboard 10, the user may merely release the sail 14 and it will fall free into the water, completely removing the danger. The sail 14 is provided at its spar 12 end with a rope 106 so that the user can readily pull the sail 14 back into sailing position.

It will be understood that modifications and variations may be effected to adapt the foregoing apparatus for the expediencies of particular applications without departing from the scope of the novel concepts of this invention.

What is claimed is:

[1. Wind-propelled apparatus comprising body means adapted to support a user and wind-propulsion means pivotally associated with said body means and adapted to receive wind for motive power for said apparatus, said propulsion means comprising a mast, a joint for mounting said mast on said body means, a sail and means for extending said sail laterally from said mast, the position of said propulsion means being controllable by said user, said propulsion means being substantially free from pivotal restraint in the absence of said user, said joint having a plurality of axes of rotation whereby said sail free falls along any of a plurality of vertical planes upon release by said user.]

[2. The apparatus of claim 1 wherein said propulsion means is adapted to be hand-held by said user but is otherwise substantially free from pivotal restraint.]

[3. The apparatus of claim 1 including means for said user to hold said sail.]

[4. The apparatus of claim 1 wherein said sail extending means comprises a boom laterally disposed on said mast to hold said sail taut and adapted to provide a hand-hold for said user.]

[5. The apparatus of claim 1 including means adapted to enable said user to grasp either side of said sail.]

[6. The apparatus of claim 1 adapted as a watercraft.]

[7. The apparatus of claim 6 including water stabilizing means associated with said body means.]

[8. The apparatus of claim 6 including leeboard means associated with said body means.]

[9. The apparatus of claim 1 wherein said propulsion means is substantially the sole means for changing the direction of travel of said apparatus.]

[10. Sail means for propelling a vehicle comprising a spar for a sail, hand-hold means associated therewith comprising a pair of curved booms arcuately connected athwart said spar for securing a sail therebetween, and means for attaching said spar to a vehicle in pivotal association therewith.]

[11. Wind-propelled apparatus comprising body means adapted to support a user, wind-propulsion means pivotally associated with said body means and adapted to receive wind for motive power for said apparatus, said propulsion means comprising a spar attached to said body in said pivotal association and a sail thereon, and a pair of curved booms arcuately connected athwart said spar and securing said sail therebetween, the position of said propulsion means being controllable by said user, said propulsion means being substantially free from pivotal restraint in the absence of said control.]

[12. The sail means of claim 10 including a sail on said spar and secured between said booms.]

[13. The apparatus of claim 1 wherein said sail has a lower edge extending outwardly from said spar, and including means spaced upwardly from at least an intermediate point on said lower edge for providing a hand-hold for said sail.]

[14. Wind-propelled apparatus comprising body means adapted to support a user and wind-propulsion means pivotally associated with said body means and adapted to receive wind for motive power for said apparatus, said propulsion means comprising a mast, boom and sail laterally extended from said mast, a joint for mounting said mast on said body means, the position of said propulsion means being controllable by said user, said propulsion means being substantially free from pivotal restraint in the absence of said user, said joint having a plurality of axes of rotation whereby said sail free falls along any of a plurality of vertical planes upon release by said user.]

*15. Wind-propelled apparatus comprising body means adapted to support a user and wind-propulsion means pivotally associated with said body means and adapted to receive wind for motive power for said apparatus, said propulsion means comprising a mast, a joint for mounting said mast on said body means, a sail and means for extending said sail laterally from said mast comprising two opposed booms secured to said mast for guiding said sail therebetween and adapted to provide a hand-hold for said user on either side of said sail while sailing, the position of said propulsion means being controllable by said user, said propulsion means being substantially free from pivotal restraint in the absence of said user, said joint having a plurality of axes of rotation whereby said sail free falls along any of a plurality of vertical planes upon release by said user.*

*16. The apparatus of claim 15 adapted as a watercraft.*

*17. The apparatus of claim 16 including water stabilizing means associated with said body means.*

*18. The apparatus of claim 16 including a dagger-board associated with said body means.*

*19. Wind-propelled apparatus comprising body means adapted to support a user and wind-propulsion means pivotally associated with said body means and adapted to receive wind for motive power for said apparatus, said propulsion means comprising a mast, a joint for mounting said mast on said body means, a sail extending in one direction only laterally from said mast, and means for extending said sail laterally from said mast comprising two opposed booms secured to said mast for guiding said sail therebetween, the position of said propulsion means being controllable by said user, said propulsion means being substantially free from pivotal restraint in the absence of said user, said joint having a plurality of axes of rotation whereby said sail free falls along any of a plurality of vertical planes upon release by said user.*

*20. Wind-propelled apparatus comprising:*

*body means adapted to support a user;*

*wind-propulsion means pivotally associated with said body means and adapted to receive wind for motive power for said apparatus, said propulsion means comprising a mast, a joint for mounting said mast on said body means, a sail extending in one direction only laterally from said mast, and means for extending said sail laterally from said mast comprising two opposed booms secured to said mast for guiding said sail therebetween and adapted to provide a hand-hold for said user on either side of said sail while sailing, the position of said propulsion means being controllable by said user;*

*said propulsion means being substantially free from pivotal restraint in the absence of said user;*

*said joint having a plurality of axes of rotation whereby said sail free falls along any of a plurality of vertical planes upon release by said user;*

*said body means comprising a sailingboard adapted to support the user on water and in a standing position on either side of said sail while sailing;*

*said sail having a foot thereof extending from a first corner of said sail, at which said sail is secured to said booms, obliquely downwardly with respect to said booms toward said mast and toward a second corner of said sail which is positioned along said mast;*

*said booms being secured to said mast above said second corner of said sail.*

*21. Wind-propelled apparatus comprising body means adapted to support a user and wind-propulsion means pivotally associated with said body means and adapted to receive wind for motive power for said apparatus, said propulsion means comprising a mast, a joint for mounting said mast on said body means, a sail extending in one direction only laterally from said mast, and means for extending said sail laterally from said mast comprising two opposed booms secured to said mast for guiding said sail therebetween and adapted to provide a hand-hold for said user on either side of said sail while sailing, the position of said propulsion means being controllable by said user, said propulsion means being substantially free from pivotal restraint in the absence of said user, said joint having a plurality of axes of rotation for establishing said pivotal association, said joint being secured to said mast to maintain said pivotal association, whereby said sail free falls along any of a plurality of vertical planes upon release by said user while said mast remains secured in said pivotal association.*

* * * * *